United States Patent Office.

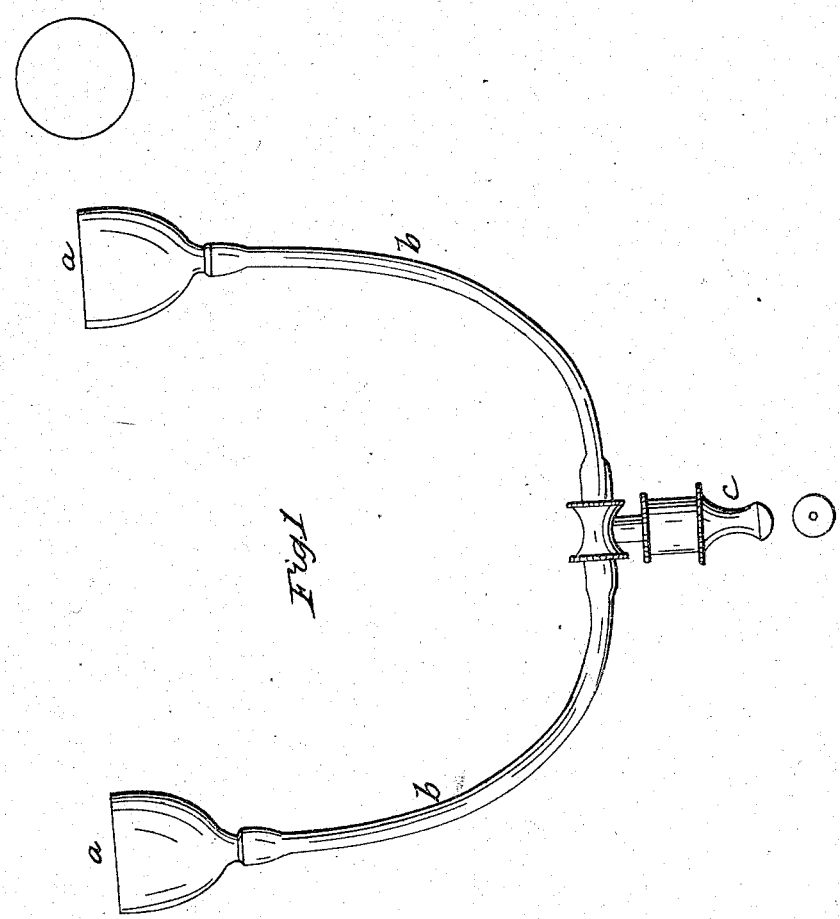

JOHN M. WINSLOW, OF ROCHESTER, NEW YORK.

Letters Patent No. 67,832, dated August 13, 1867.

---

IMPROVEMENT IN EYE-CUPS.

---

*The Schedule referred to in these Letters Patent and making part of the same.*

---

TO ALL WHOM IT MAY CONCERN:

Be it known that I, JOHN M. WINSLOW, of Rochester, in the county of Monroe, and State of New York, have invented a new and useful Improvement in Optical Instruments for restoring sight to the eye when it has become impaired by age or other causes; and I do hereby declare that the following is a full and exact description of the construction and operation of the same, reference being had to the annexed drawing, and to the letters of reference marked thereon, making part of the specification.

Figure 1 is a view of the instrument.

$a\ a$ are two cups, made of hard rubber or other material, so shaped interiorly as to fit the ball of the eye and press upon the periphery when applied thereto. $b\ b$ are two pieces of rubber tubing, about six inches long, attached at one end to the cups $a\ a$, and connecting at the other end with a mouth-piece, C, having an opening through the tube of the same for exhausting the air.

The operation of the instrument is described as follows: By first placing the tube of the mouth-piece C between the teeth, the cups $a\ a$ are then to be applied to the eyes, firmly closed, and by means of suction through the tube of the mouth-piece C, the cups $a\ a$ are made to adhere firmly to the eyes. In order to retain the suction and the desired pressure or draught upon the eyes, the tongue should be placed against the orifice of the mouth-piece C. By this operation the eyes will be crowded into the cups $a\ a$, and thereby assume more than their ordinary convexity, while the cups are in this manner applied to them. By repeating the operation in this way every day, for the space of about ten minutes each time, for the period of one or two months, the eyes will be gradually and permanently restored to their original shape or convexity, and, as a consequence, the sight, when impaired by age or other causes, will be made as good as ever.

The great advantage this instrument possesses over similar instruments heretofore constructed for the same purpose consists in being able to operate upon both eyes at one and the same time, and also in causing the pressure or draught upon the eyes to be exactly equal upon both. Being wholly under the control of the operator, any discomfort in its application, or possible injury to the eyes by its application and use, is easily avoided.

Claim.

What I claim as my invention, and for which I desire to obtain Letters Patent, is—

The instrument herein described, consisting of two cups, to which rubber tubing is attached, connecting with a mouth-piece, having an opening in the tube thereof, for the purpose of exhausting the air by means of suction with the mouth, thereby producing a vacuum between the eyes and the cups, in the manner and for the purposes substantially as set forth.

JOHN M. WINSLOW.

Witnesses:
J. P. HOGEBOOM,
GEORGE FRAUENBERGER.